(12) United States Patent
Yajima et al.

(10) Patent No.: US 7,830,539 B2
(45) Date of Patent: Nov. 9, 2010

(54) ELECTRONIC DEVICE CONTROL SYSTEM, PORTABLE DATA STORAGE DEVICE, DATA PREPARATION DEVICE, ELECTRONIC DEVICE, AND OPERATION DATA MANAGEMENT DEVICE

(75) Inventors: Shunsuke Yajima, Nara (JP); Syoichiro Yoshiura, Ikoma-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 648 days.

(21) Appl. No.: 11/131,669

(22) Filed: May 17, 2005

(65) Prior Publication Data
US 2005/0213151 A1    Sep. 29, 2005

Related U.S. Application Data

(62) Division of application No. 09/920,383, filed on Aug. 1, 2001.

(30) Foreign Application Priority Data

Aug. 3, 2000    (JP)    ............................. 2000-236158

(51) Int. Cl.
G06F 3/12 (2006.01)
G06F 15/177 (2006.01)
G06F 15/173 (2006.01)
G06F 13/00 (2006.01)
G06K 15/00 (2006.01)
H04B 7/00 (2006.01)
H04M 11/00 (2006.01)
H04M 1/00 (2006.01)

(52) U.S. Cl. .................... 358/1.15; 358/1.16; 358/1.13; 358/1.1; 709/220; 709/224; 709/225; 709/229; 710/104; 710/106; 370/310; 455/403; 455/422.1; 455/456.1

(58) Field of Classification Search ........................ None
See application file for complete search history.

(56) References Cited

U.S. PATENT DOCUMENTS 5,797,079 A * 8/1998 Creutzmann et al. ........ 399/384
5,862,321 A * 1/1999 Lamming et al. ........... 709/200

(Continued)

FOREIGN PATENT DOCUMENTS

JP    05-201067 A    8/1993

(Continued)

*Primary Examiner*—Edward L Coles
*Assistant Examiner*—Hilina S Kassa
(74) *Attorney, Agent, or Firm*—Edwards Angell Palmer & Dodge LLP; David G. Conlin; David A. Tucker

(57) ABSTRACT

When preparing print data by a personal computer, identification data corresponding to the print data is also prepared. The print data is transmitted via a network to a printer, and the identification data is transmitted to a portable phone by wireless, and stored in a memory in the portable phone. When a user approaches the printer carrying the portable phone, the identification data is transmitted to the printer by wireless. The printer carries out image output processing based on the print data corresponding to the received identification data. Thus, in a control system for an electronic device such as an image output device, operation control can be conducted by each print job, and by such operation control, the whole system including an electronic device and data preparation means such as a personal computer can be controlled more efficiently.

9 Claims, 12 Drawing Sheets

U.S. PATENT DOCUMENTS

| | | | |
|---|---|---|---|
| 5,974,297 A * | 10/1999 | Creutzmann et al. | 399/384 |
| 6,137,590 A | 10/2000 | Mori | |
| 6,151,464 A * | 11/2000 | Nakamura et al. | 399/79 |
| 6,166,826 A * | 12/2000 | Yokoyama | 358/1.16 |
| 6,173,338 B1 * | 1/2001 | Fukuta | 710/5 |
| 6,236,486 B1 * | 5/2001 | Nocker, IV | 398/129 |
| 6,298,405 B1 * | 10/2001 | Ito et al. | 710/107 |
| 6,301,016 B1 * | 10/2001 | Matsueda et al. | 358/407 |
| 6,448,906 B1 * | 9/2002 | Nachtsheim et al. | 340/945 |
| 6,459,496 B1 * | 10/2002 | Okazawa | 358/1.14 |
| 6,628,430 B1 * | 9/2003 | Silverbrook et al. | 358/473 |
| 6,650,430 B2 * | 11/2003 | Francis et al. | 358/1.14 |
| 6,744,528 B2 * | 6/2004 | Picoult et al. | 358/1.15 |
| 6,778,289 B1 * | 8/2004 | Iwata | 358/1.15 |
| 6,806,976 B1 * | 10/2004 | Suyehira | 358/1.14 |
| 6,862,583 B1 * | 3/2005 | Mazzagatte et al. | 705/64 |
| 6,972,861 B1 * | 12/2005 | van Zee et al. | 358/1.15 |
| 6,981,015 B1 * | 12/2005 | Palmer et al. | 709/201 |
| 7,084,994 B1 * | 8/2006 | Koppich et al. | 358/1.15 |
| 7,106,461 B2 * | 9/2006 | Kakigi et al. | 358/1.15 |
| 7,126,716 B1 * | 10/2006 | Kaufman et al. | 358/1.18 |
| 7,173,722 B1 * | 2/2007 | Lapstun et al. | 358/1.15 |
| 7,305,457 B2 * | 12/2007 | Yajima et al. | 709/220 |
| 2001/0008837 A1 * | 7/2001 | Takahashi | 455/403 |
| 2003/0017805 A1 * | 1/2003 | Yeung et al. | 455/41 |
| 2003/0065805 A1 * | 4/2003 | Barnes, Jr. | 709/231 |
| 2003/0126328 A1 * | 7/2003 | Reilly | 710/104 |
| 2003/0184801 A1 * | 10/2003 | Murata | 358/1.16 |

FOREIGN PATENT DOCUMENTS

| | | |
|---|---|---|
| JP | 5-273338 A | 10/1993 |
| JP | 06-153271 A | 5/1994 |
| JP | 07-093116 A | 4/1995 |
| JP | 07-323616 A | 12/1995 |
| JP | 09-138741 | 5/1997 |
| JP | 09-185474 A | 7/1997 |
| JP | 09-240074 A | 9/1997 |
| JP | 09-314925 A | 12/1997 |
| JP | 10-016355 | 1/1998 |
| JP | 10-023548 A | 1/1998 |
| JP | 10-056674 A | 2/1998 |
| JP | 10-154046 A | 6/1998 |
| JP | 11-149233 | 6/1999 |
| JP | 11-249848 | 9/1999 |
| JP | 11-305968 | 11/1999 |
| JP | 11-353133 A | 12/1999 |
| JP | 2000-085211 A | 3/2000 |
| JP | 2000-163465 A | 6/2000 |
| JP | 2000-177212 | 6/2000 |
| JP | 2000-194521 A | 7/2000 |
| JP | 2001-312388 | 11/2001 |

* cited by examiner

FIG. 8

| PRINTOUT PERMISSION CODE LIST ||
|:---:|:---:|
| A001 ⁀ A250 | C072 ⁀ C098 |
| B051 ⁀ B065 | D001 D004 D005 |

FIG. 12
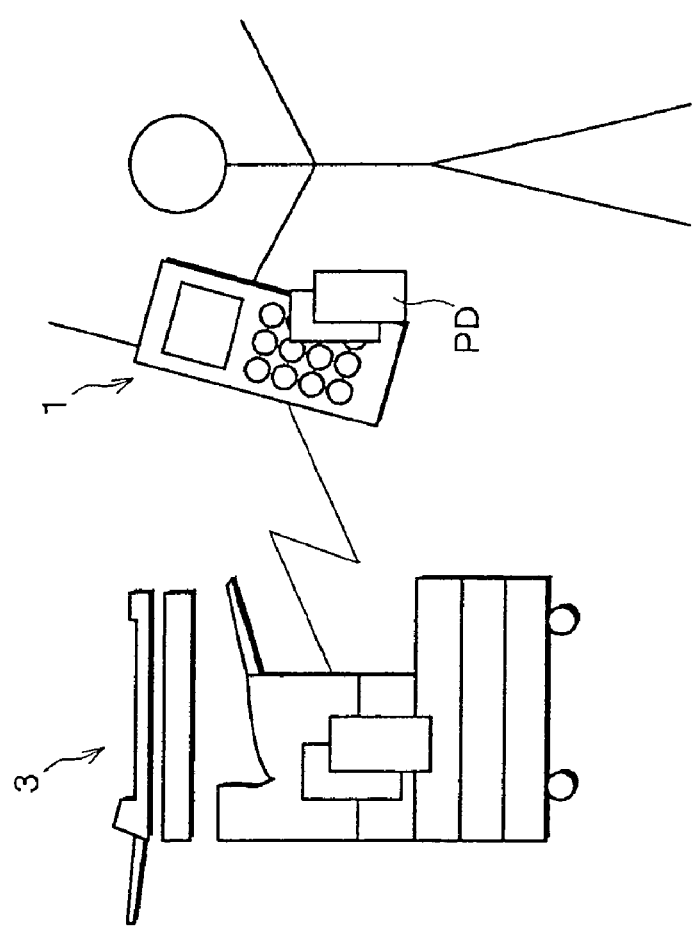
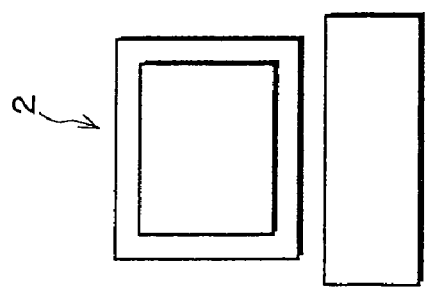

ELECTRONIC DEVICE CONTROL SYSTEM, PORTABLE DATA STORAGE DEVICE, DATA PREPARATION DEVICE, ELECTRONIC DEVICE, AND OPERATION DATA MANAGEMENT DEVICE

CROSS REFERENCE TO RELATED APPLICATIONS

This application is a divisional of U.S. Ser. No. 09/920,383 filed Aug. 1, 2001, which is incorporated in its entirety herein by reference.

FIELD OF THE INVENTION

The present invention relates to an electronic device control system in which, for example, an image output device as an electronic device and a personal computer as data preparation means are connected via a network.

BACKGROUND OF THE INVENTION

Conventionally, an image output system which permits a print direction of image data to be given from a PC (Personal Computer) connected to a network such as a LAN (Local Area Network) to an image output device such as a printer, a digital composite machine, etc., also connected to the network has been introduced in offices, etc. In the image output system, the user directs a specific image output device to print out the image data prepared by the PC, then output processing is carried out by the image output device as a print job.

However, when a user directs a specific image output device to print out image data as a print job in the above conventional network environment, the image output processing is not always carried out immediately. For example, in the case where the image output device specified by the user is in the middle of carrying out the output processing of the preceding print job, the image output device is occupied until the preceding print job is completed. In addition, when a plurality of print jobs are directed to a specific image output device at once, there is a possibility that the printed matter produced according to a print job directed by a user might mix into the printed matter produced according to other print jobs. Thus, various problems inherent in a network have been caused in a system in which an image output device is used in common in a network environment.

Hence, various techniques have been proposed recently to receive each print job directed by a user securely, to prevent the mixture of the printed matter produced according to a plurality of print jobs, and to ensure secrecy. For example, in Japanese Unexamined Patent Publication No. 10-16355/1998 (Tokukaihei 10-16355), the following system is disclosed.

In this system, when a user transmits image data as a print job to an image output device, via a terminal such as a PC used or owned by the user, the image output device manages (stores) the image data along with identification data which identifies the user. The image output device is set not to print out a print job immediately when it receives the print job. Also in this system, each user has an information storage medium which stores predetermined identification data, and when the user who directed the print job approaches the image output device, the identification data of the print job and the identification data read out noncontact from the user's information storage medium are compared. If the both identification data match and it is confirmed that the user who directed the print job stored in the image output device is approaching the image output device, the directed print job is printed out.

In the foregoing technique, a specific print job is printed out on condition that the user is in proximity to the image output device (for example, in front of the image output device), allowing to securely provide the printed matter produced according to the specific print job to the user who directed the print job.

However, in the foregoing conventional technique, for example, when a single user transmits a plurality of print jobs to the image output device, the image output device can identify the user but cannot identify the print job the user wishes to print out among those stored in the image output device. Therefore, when a plurality of print jobs directed by a single user are stored, the user has to direct the output of the print job by operating the image output device and identifying the desired print job, which requires more steps in operation.

SUMMARY OF THE INVENTION

It is therefore an object of the present invention to provide an electronic device control system which is capable of providing operation control for each print job in an electronic device such as an image output device, and controlling the whole system including data preparation means such as a PC and an electronic device such as a printer more efficiently in accordance with such operation control.

To attain the above object, an electronic device control system in accordance with the present invention is structured so as to include:

data preparation means for preparing operation data and identification data corresponding to the operation data;

an electronic device which carries out processing based on the operation data prepared by the data preparation means; and portable data storage means for receiving the identification data prepared by the data preparation means, the portable data storage means including identification data storage means for storing the identification data, wherein the portable data storage means transmits the identification data stored in the identification data storage means to the electronic device, and when the electronic device receives the identification data from the portable data storage means, the electronic device carries out the processing based on the operation data corresponding to the identification data.

According to the foregoing structure, first, the identification data prepared by the data preparation means is transmitted to the portable data storage means, and stored in the identification data storage means. Then, when the stored identification data is transmitted from the portable data storage means to the electronic device, the electronic device carries out the processing based on operation data corresponding to the identification data.

Conventionally, for example, the operation of the electronic device is controlled such that identification data such as personal information is stored in a magnetic card in advance, and the electronic device reads the magnetic card for operation control. On the other hand, according to the foregoing structure, unlike in a conventional structure, the portable data storage means does not store specified identification data permanently, but stores identification data which is prepared along with operation data and corresponds to the operation data. Therefore, while the processing in the electronic device is conventionally controlled just in accordance with fixed information including personal information, the foregoing structure of the present invention can control the processing in the electronic device according to various identification data which varies based on operation data, providing more accurate control and eliminating the user's time and efforts required to perform an operation, for example, to select operation data.

Further, an electronic device control system in accordance with the present invention is structured so as to include:

data preparation means for preparing operation data;

an electronic device which carries out processing based on the operation data prepared by the data preparation means; and portable data storage means for receiving the operation data prepared by the data preparation means, the portable data storage means including operation data storage means for storing the operation data, wherein the portable data storage means transmits the operation data stored in the operation data storage means to the electronic device, and when the electronic device receives the operation data from the portable data storage means, the electronic device carries out the processing based on the operation data.

According to the foregoing structure, first, the operation data prepared by the data preparation means is transmitted to the portable data storage means, and stored in the operation data storage means. Then, when the stored operation data is transmitted from the portable data storage means to the electronic device, the electronic device carries out the processing based on the operation data.

Since the portable data storage means stores operation data, there is no need for a user to store the operation data which operates the electronic device in a storage medium and carry the medium. That is, the portable data storage means has a function as a storage medium such as a floppy disk or an optical magnetic disc. Thus, it becomes possible to provide a system which does not require a network to connect the data preparation means and the electronic device but functions similar to the system having the network.

In addition, even in a case where the data preparation means and the electronic device are connected to the network, since the portable data storage means can store operation data, the operation data can also be transmitted to the electronic device which is not connected to the network to perform a specified operation. Therefore, the versatility in the operation control of the electronic device can be further enhanced.

For a fuller understanding of the nature and advantages of the invention, reference should be made to the ensuing detailed description taken in conjunction with the accompanying drawings.

BRIEF DESCRIPTION OF THE DRAWINGS

FIG. 6(a) shows the flow of print processing in a PC, and FIG. 6(b) shows the flow of print processing in a printer.

FIG. 8 is a table showing an example of a list of codes which are permitted for printout, stored in the printer.

FIG. 12 is an explanatory view showing a condition where the print job is conducted by the printer in the image output system shown in FIG. 10.

DESCRIPTION OF THE PREFERRED EMBODIMENTS

Referring to the figures, the following description will describe an embodiment in accordance with the present invention.

First, an image output system in accordance with the present embodiment will be briefly described. The image output system is structured as an image output system including a printer as a digital image output device and a personal computer (hereinafter referred to as PC) Operation data transmitted and received between the printer and the PC at least includes print data for a print job. This operation data is prepared by the PC, and the printer operates based on the operation data. In the image output system of the present embodiment, a portable phone which is capable of storing certain data is adopted. Examples of the data to be stored in this portable phone include identification data for identifying the print data as will be explained in detail later.

The printer is capable of reading out the identification data from the portable phone in a vicinity of the printer. This data reading out operation is performed by non-contact means, for example, by wireless. In addition, the PC is arranged so as to prepare the identification data along with the print data, and to store at least the identification data in the portable phone.

In the foregoing image output system, there are two methods for transmitting print data from the PC to the printer; a method via a network and a method via a portable phone. The method via a network is a method for transmitting the print data along with the identification data to the printer via a network. The method via a portable phone is a method for storing the print data along with the identification data in a portable phone, and transmitting the data to the printer via the portable phone. Each of these methods will be described later in detail.

Figure 1:
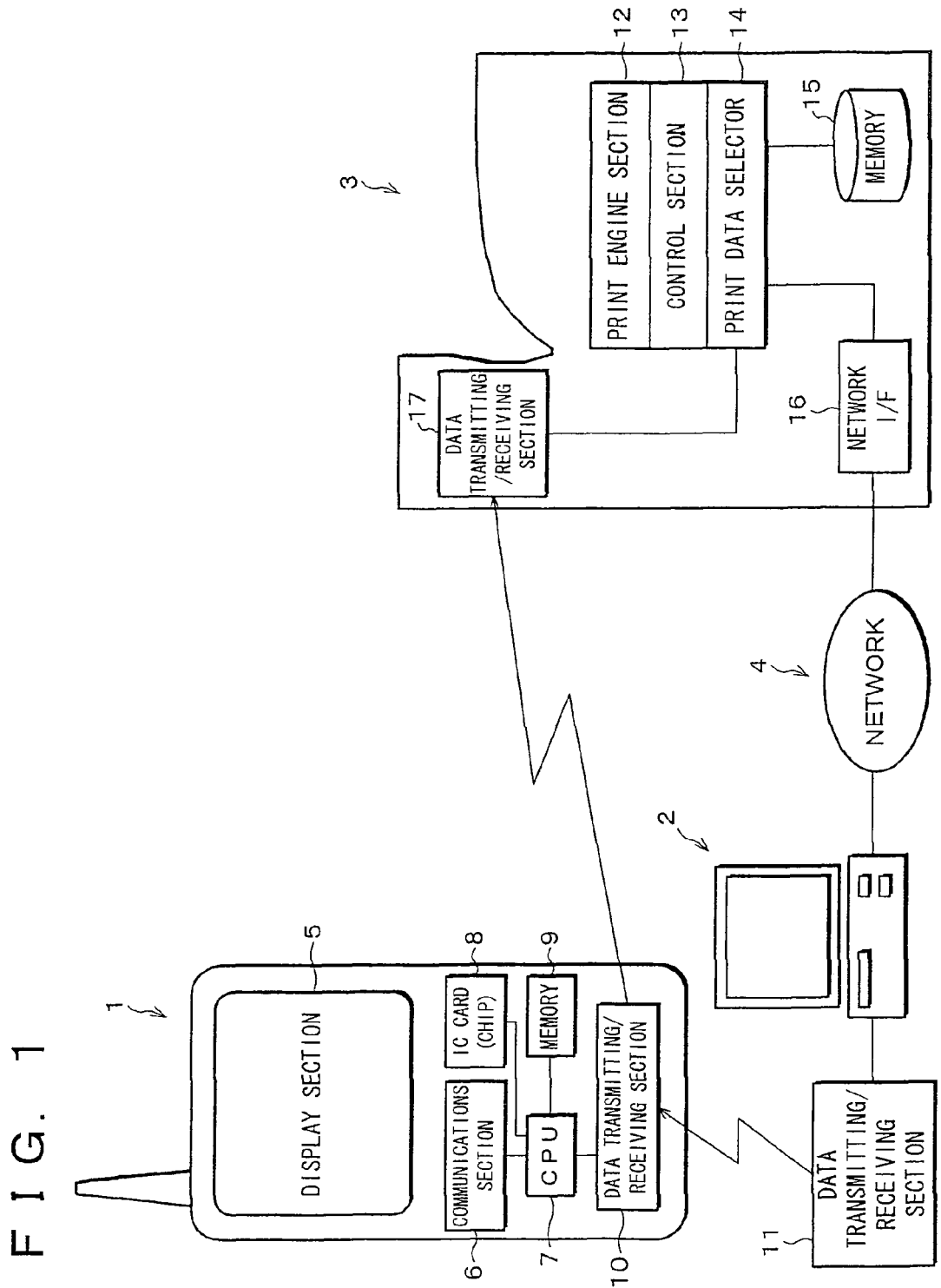
FIG. 1 is an explanatory view showing a schematic structure of an image output system in accordance with an embodiment of the present invention.

FIG. 1 is an explanatory view showing a schematic structure of the image output system (an electronic device control system) in accordance with the present embodiment. As shown in FIG. 1, the image output system is structured so as to include a portable phone (portable data storage means) 1, a PC (Personal Computer) 2, and a printer (an image output device) 3. The PC 2 and the printer 3 are connected via a computer network 4 (hereinafter referred to as a network 4) which is composed of such as a LAN.

The portable phone 1 includes a display section 5, a communications section 6, a CPU (Central Processing Unit) 7, an IC card 8, a memory 9, and a data transmitting/receiving section 10. The structure of the portable phone 1 is basically almost the same as that of a PDC (Personal Digital Cellular phone, Japanese version) currently available in the market, except that the data transmitting/receiving section 10 is added and the processing procedures in the CPU 7, the IC card 8, and the memory 9 are altered in accordance with the operation of the data transmitting/receiving section 10.

The display section 5 is display means to display, for example, a dialing telephone number, a telephone number of transmitting end, and the contents of the functions such as e-mail transmitting/receiving function and Internet browsing function if the portable phone 1 has such functions. The display section 5 is composed of such as a LCD (Liquid Crystal Display) or an EL (Electroluminescence) panel. The display section 5 also provides displays according to various processing operations of the portable phone 1.

The communications section 6 is a block to perform the communications operation in a normal portable phone, that is, to transmit/receive talking signals and data signals, and is composed of, for example, an antenna section, a RF (Radio Frequency) section, a base band section, and a communications control section.

The CPU 7 is a central part to perform computations on a variety of processing carried out in the portable phone 1. The IC card 8 is composed of, for example, an ASIC (Application Specify Integrated Circuit) or the like, and includes, for example, a DSP (Digital Signal Processor), a ROM (Read Only Memory)/RAM (Random Access Memory), a PLL (Phase Locked Loop) and CLK (Clock), a LCD controller, a system timer, an external modem I/F, a GPIO I/F, or the like.

The memory 9 is memory means to temporarily store various data received by the data transmitting/receiving section 10 (will be described later in detail), and is composed of, for example, a RAM or an EEPROM (Electrically Erasable and Programmable ROM).

The data transmitting/receiving section 10 is a block to transmit/receive data between the PC 2 and the printer 3 by wireless. As for methods for transmitting/receiving the data, Bluetooth or IrDA can be adopted, but any method which permits wireless communications may be adopted. In addition, the portable phone 1 may be structured without having the data transmitting/receiving section 10, wherein data communications between the PC 2 and the printer 3 is conducted by the communications section 6, which conducts the general communications in the portable phone.

The PC 2 is composed of a personal computer generally used in a variety of fields, and includes a PC main unit, monitor means such as a CRT (Cathode Ray Tube) or a LCD, and input means such as a keyboard and a mouse. The PC 2 is provided with communications functions including an interface for Ethernet (for example, a LAN card for PCI bus) so as to be connected to the network 4 such as a LAN, and also provided with a data transmitting/receiving section 11 to perform data communications with the portable phone 1. The communications method of the data transmitting/receiving section 11 complies with the communications method of the data transmitting/receiving section 10 of the portable phone 1.

Software packages such as a document preparation program and an image editing program are installed in the PC 2, and various documents and images can be prepared using the programs. In addition, the programs have a printout function, and designated documents and images can be printed out. Here, the printout is conducted by the printer which is registered in the OS (Operating System) running on the PC 2. The printer registered in the OS may be the one directly connected to the PC 2 or the one connected to the PC 2 via the network 4.

The PC 2 has a hard disk for storing therein various program data and document/image data. Further, the PC 2 may be equipped with a floppy disk drive, an MO drive, a CD-R drive, or the like, and it may store and read various data in and from these storage media.

The printer 3 includes a print engine section 12, a control section 13, a print data selector 14, a memory 15, a network I/F 16, and a data transmitting/receiving section 17. The structure of the printer 3 is basically the same as a network-ready printer which is widely used at present, except that it includes the data transmitting/receiving section 17 to perform data communications with the portable phone 1.

Print data as a print job inputted from the network 4 via the network I/F 16 is stored in the memory 15 via the print data selector 14. When actually printing out the data stored in the memory 15, the data is read out from the memory 15 by the print data selector 14, and the data as read out is printed out by the print engine section 12 under the control by the control section 13. The communications method of the data transmitting/receiving section 17 complies with the communications method of the data transmitting/receiving section 10 of the portable phone 1.

Here, the printing method of the print engine section 12 is not particularly limited, and, for example, the laser printing method, the ink-jet printing method, or the thermal transfer printing method may be adopted.

Figure 2:
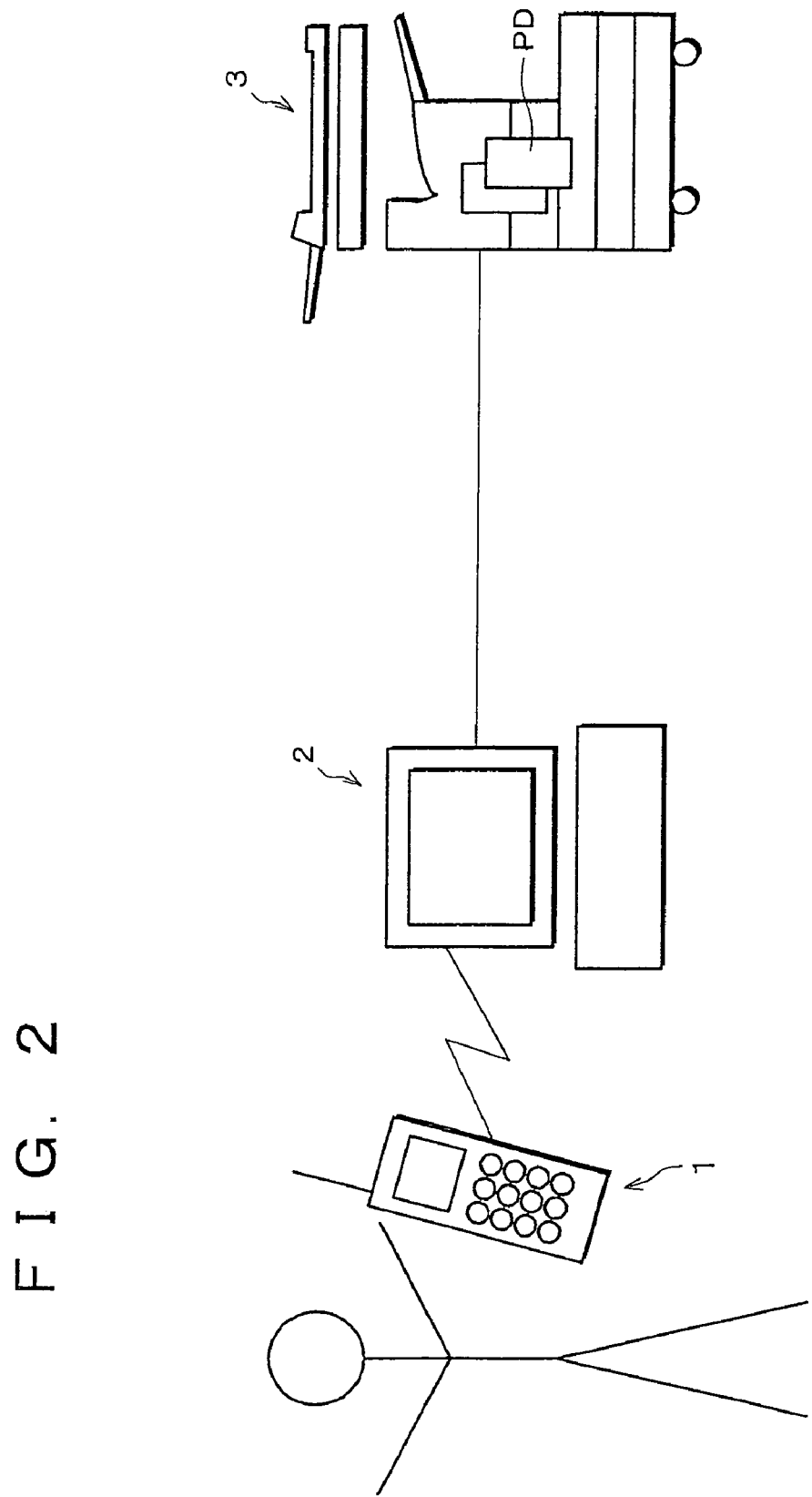
FIG. 2 is an explanatory view showing a condition where a print job is directed via a PC in the foregoing image output system.

Next, specific operations in the image output device of the foregoing structure will be described. First, in the foregoing image output system, when the PC 2 directs the printer 3 to conduct a print job, as shown in FIG. 2, the data transmitting/receiving section 11 of the PC 2 transmits identification data by wireless communications to the data transmitting/receiving section 10 of the portable phone 1 possessed by a user. The identification data received from the PC 2 to the portable phone 1 is stored in the memory 9 of the portable phone 1. At the same time, when the PC 2 directs the printer 3 to conduct the print job, the PC 2 transmits print data corresponding to the print job and identification data corresponding to the print data to the printer 3, and both data are stored in the memory 15 of the printer 3. Here, in FIG. 2, "PD" shown in the inside of the printer 3 denotes the print data corresponding to the print job.

Data contained in the identification data is not particularly limited, as long as each print data can be identified precisely. For example, the identification data may include preparation time of the print data, print job priority, name (ID) of the PC by which the print data is prepared, etc. Here, it is preferable to standardize the identification data, because the standardization allows the identification data to be prepared and transmitted/received always in a predetermined data size, which makes it possible to grasp the number of the identification data which can be stored in the portable phone 1. It is also preferable that the data amount of the identification data is not so large. This is because by limiting the storage capacity required for the memory 9 of the portable telephone 1, an increase in cost of the portable telephone 1, increases in size, weight, and the manufacturing cost of the portable phone 1 can be suppressed.

Figure 3:
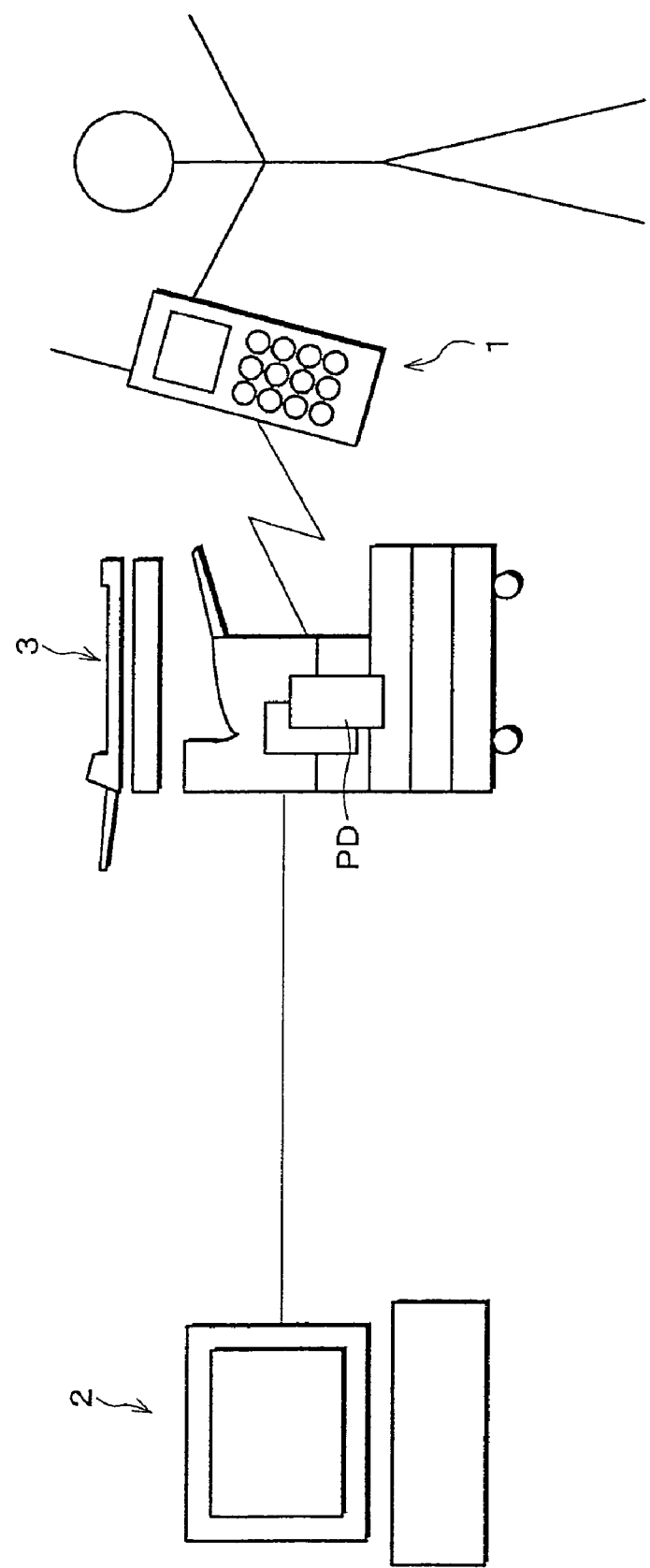
FIG. 3 is an explanatory view showing a condition where the print job is conducted by a printer in the foregoing image output system.

When the user who has the portable phone 1 storing the foregoing identification data approaches the printer 3, the identification data is automatically transmitted from the portable phone 1 to the printer 3, as shown in FIG. 3. The transmission/reception of the identification data is performed between the data transmitting/receiving section 10 of the portable phone 1 and the data transmitting/receiving section 17 of the printer 3.

In the printer 3, the print data selector 14 identifies the user who directed a print job and approaches the printer 3, by collating the identification data received by the data transmitting/receiving section 17 with the identification data attached to the print data stored in the memory 15 of the printer 3 for management.

Here, when plural sets of print data prepared by the user approaching the printer 3 and received by the printer 3 as print jobs are stored in the memory 15, the print data prepared earliest or with top priority, for example, is selected based on the preparation time of each set of print data or the priorities of the print jobs, and the print job is conducted based on the print data. According to the foregoing structure, the print job directed by the user is conducted only when the user approaches the printer 3, and it is therefore possible to control the operation of the printer 3 via the network 4 more efficiently.

The printer 3 may be structured so as to include a display section (not shown) such as a liquid crystal panel, and when the control section 13 of the printer 3 recognizes that the user approaches the printer 3 and judges that a plurality of the print data transmitted by the user are stored in the memory 15, the plural sets of the print data may be shown on the display section. Although, with this structure, the print job is not performed automatically, the user is permitted to select the print job desired at that moment.

Further, the data transmitted and received between the printer 3 and the portable phone 1 may include not only the identification data prepared for each print data, but also, for example, user identification data specified for each user using the PC 2, portable phone identification data specified for each portable phone, and the like, which will be described later in detail. With such identification data, user recognition and print data recognition can be conducted with more reliability.

In the foregoing example, the image output system is structured such that the identification data for each print job is transmitted from the portable phone 1 to the printer 3, and the print jobs directed by the user and stored in the printer 3 are displayed on the display section of the printer 3, but the present invention is not limited to this structure. For example, when the printer 3 is not provided with a display section having a sufficient display capability, and the portable phone 1 is provided with a display section having a sufficient display capability, the image output system can be structured such that the identification data for each print job stored in the printer 3 is transmitted from the printer 3 to the portable phone 1, the print jobs are displayed on the display section 5 of the portable phone 1, and the desired print job can be selected using the portable phone 1.

Figure 4:
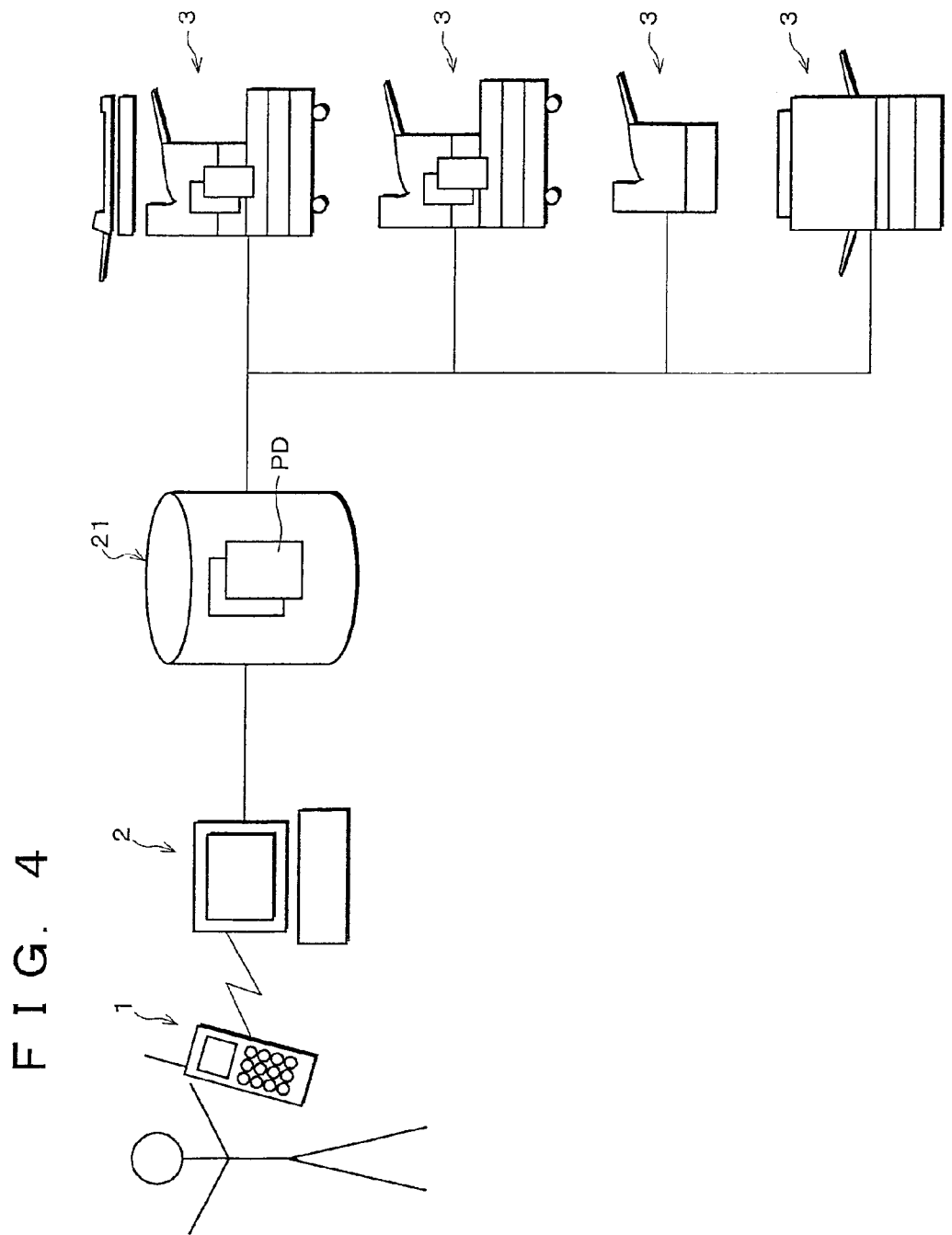
FIG. 4 is an explanatory view showing a condition where a print job is directed via a PC in an image output system different from the one shown in FIG. 1.

Next, the following will explain another image output system which is different from that shown in FIGS. 2 and 3. As shown in FIG. 4, the image output system here is the same as that shown in FIGS. 2 and 3 in that the printer 3 and the PC 2 are connected via the network 4 (not shown in FIG. 4) and print data prepared by the PC 2 is printed out by the printer 3 via the network 4. The difference between the two systems is that the image output system in FIG. 4 has a plurality of the printers 3, and each printer 3 does not have the memory 15 such as a hard disk to store print data, but instead, a print server (operation data management means) 21 is provided between the PC 2 and the printers 3 to store print data. The print server 21 can temporarily store print data and identification data attached to the print data. The print server 21 performs a function as print data management means to manage the data output process to print out the print data prepared by the PC 2 to one of the printers 3.

Figure 5:
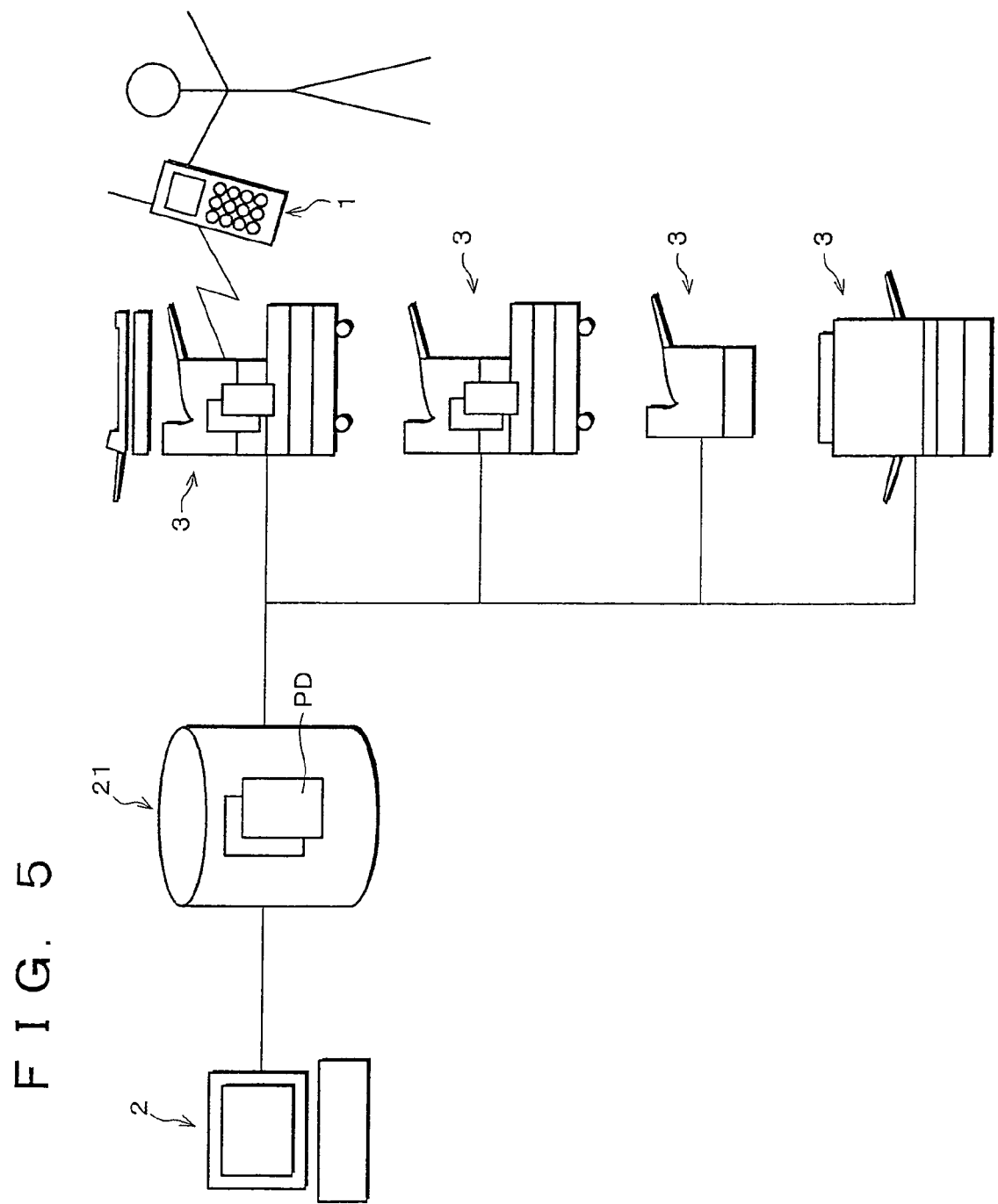
FIG. 5 is an explanatory view showing a condition where the print job is conducted by a printer in the image output system shown in FIG. 4.

In this manner, in the image output system shown in FIGS. 4 and 5, print data is temporarily stored in the print server 21. Then, as shown in FIG. 5, when a specific user approaches a specific one of the plurality of the printers 3, and the printer 3 as specified by the user receives identification data from the portable phone 1 possessed by the user, the printer 3 transmits the information to the print server 21, then the print server 21 transmits the applicable print data to the printer 3. As a result, there is no need to provide a memory to store print data in the printer 3, and the print server 21 can manage and control all the plurality of the printers 3. Therefore, since each printer 3 has less burden, the function level required to each printer 3 is lowered, thereby reducing the cost of the printer 3.

In this manner, the image output system shown in FIGS. 4 and 5 is effective where the system has a plurality of at least either of the printer 3 and the PC 2 connected to the network 4. That is, when the system has a plurality of at least either of the printer 3 and the PC 2, the operation control of the printer 3 becomes complicated in general, but in the present embodiment, the printer 3 reads identification data from the portable phone 1 and transmits the identification data to the print server 21, and the print server 21 conducts an actual control of the print jobs. Therefore, the print server 21 can control the operation of each printer 3 with reliability even if the network 4 has a complicated structure.

As shown in FIGS. 4 and 5, the image output system of the present embodiment is structured wherein a plurality of the printers 3 are connected to the network 4. Here, the printers 3 do not have to have identical functions but may have specific functions respectively.

For example, the printer 3 shown top in FIGS. 4 and 5 represents a fully equipped printer having an optional scanner and a plurality of optional paper cassettes. The printer 3 located second from the top does not have a scanner but equipped with a plurality of paper cassettes. The printer 3 located third from the top is a standard type printer equipped with one paper-cassette, without having a scanner. All of these three printers 3 are monochrome printers having identical print engine sections. The printer 3 shown at the bottom (fourth from the top) represents a printer which is capable of color image formation and high speed image formation.

For example, when the user prepares color print data using the PC 2 and transmits the data to the print server 21, the above three monochrome printers 3 cannot print out the print job with color as the user desires. Hence, each printer 3 is provided with a display section such as a liquid crystal panel, and the print server 21 confirms the content of the print data, judges whether or not a selected function required to print out the print job according to the print data (in this case, color print function) is included in the functions of the printer 3 to which the user approaches, and displays the result of the judgment on the display section of the printer 3. This structure provides the user with accurate information on whether or not the printer 3 in front of the user can surely print out the desired print job, ensuring more reliable operation control of the printers 3.

For example, when the print job directed by the user is a color print but the printer 3 to which the user approaches is a monochrome printer, a message "color print is not available" is displayed on the display section of the printer 3. Here, the system may be arranged so as to inform the user of a printer 3 (for example, the printer 3 at the bottom) suited for the print job directed by the user by the display section of the printer 3 specified by the user. This structure provides the user with accurate information on which printer 3 can conduct the desired print job.

Functions selectable in the printer 3 are not particularly limited, and they include, for example, color print function, high speed printing function, sorting function, and the like, as mentioned above. When the printer 3 is a composite machine, fax and other functions are included in the selectable functions. In addition, post-printing processing functions such as stapling and binding functions may be included in the selectable functions.

In the foregoing example, the explanation has been given for the structure where the print server 21 judges whether the available functions of the printer 3 include a function required to conduct the print job. The present invention is not limited to the structure, and the printer 3 may conduct the judgment. That is, the image output system of the present embodiment may be structured such that, when the user approaches a specific printer 3 and the print job is transmitted to the printer 3, the control section 13 of the printer 3 conducts the above judgment.

Here, referring to the flow charts in FIGS. 6(a) and 6(b), the following will describe the flow of print processing including the control to check whether or not the available functions of the printer 3 include the function required to conduct the print job directed by the user. In this example, explanations will be given through the case wherein the control on the foregoing judgment is performed by the printer 3, and a print job is transmitted directly from the PC 2 to the printer 3, without using the print server 21.

First, the operation of the PC 2 will be explained referring to the flow chart shown in FIG. 6(a). When a user directs a print job to the PC 2 in Step 1 (hereinafter, each step will be referred to as S1 and the like), print direction information is transmitted to the portable phone 1 and the content of the information is stored in the portable phone 1 (S2). At the same time, print data and identification data for the print job are transmitted to the printer 3 (S3). Thus, the process in the PC 2 is completed.

Figure 6:
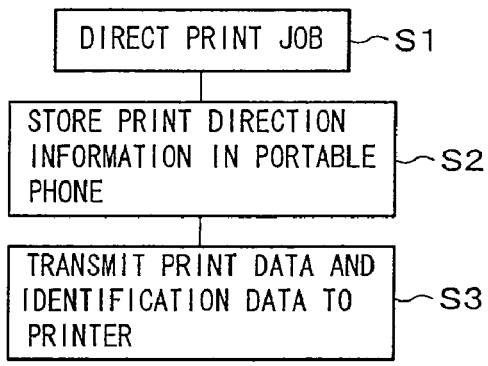
FIGS. 6(a) and 6(b) are flow charts showing the flow of print processing including the control to check whether or not functions selectable at the printer include the function required to conduct the print job.
Figure 6:
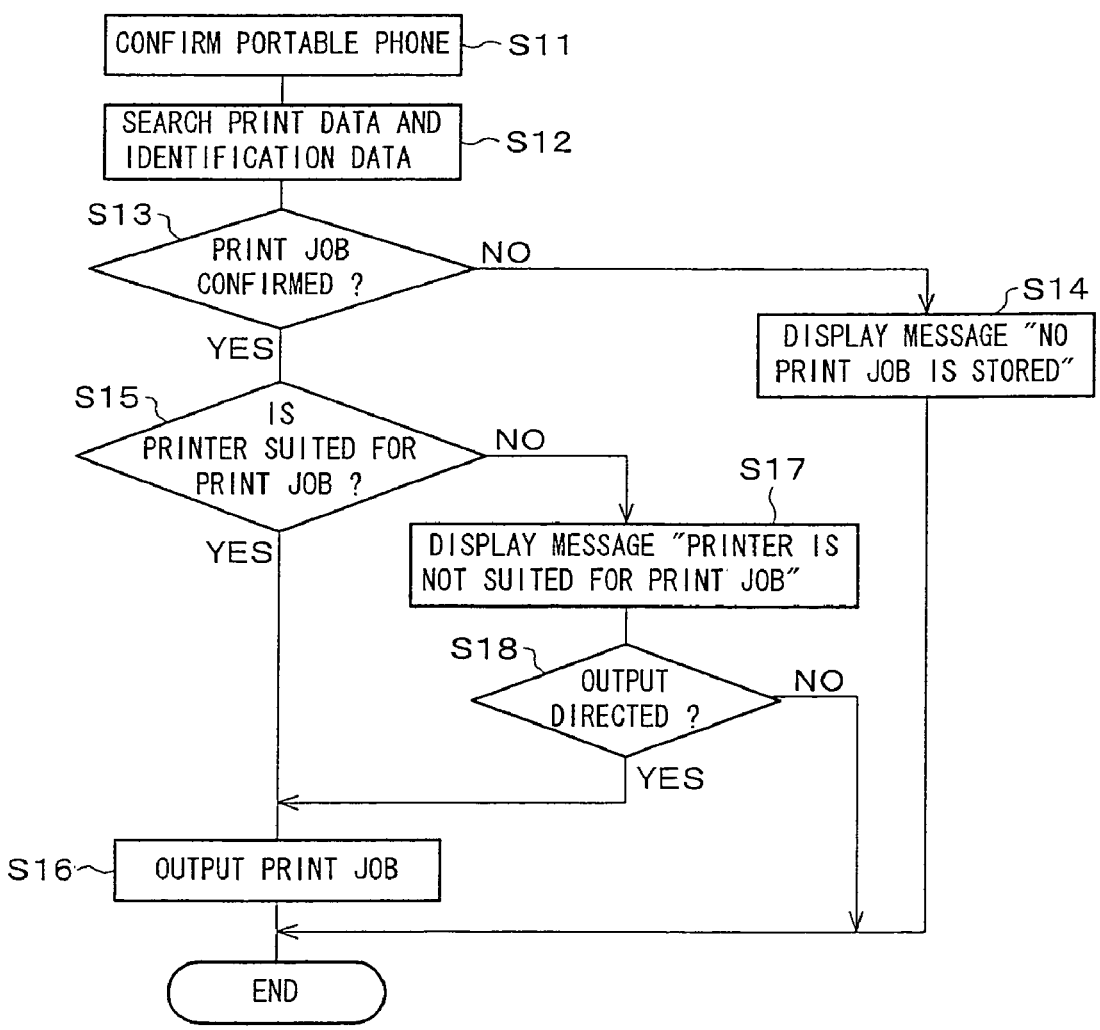

Next, referring to the flow chart shown in FIG. 6 (b), the operation of the printer 3 will be explained. When the user having the portable phone 1 approaches the printer 3 in S11, data transmission is conducted between the data transmitting/receiving section 10 of the portable phone 1 and the data transmitting/receiving section 17 of the printer 3, and the printer 3 recognizes the portable phone 1 possessed by the user, by which the printer 3 confirms his approach. Then, the printer 3 searches the print data and the identification data stored in the printer 3 (S12), and confirms if print job is transmitted by the user (S13). When it is judged that the printer 3 does not store the print job transmitted by the user in S13 (NO in S13), the display section of the printer 3 display a message that there is no applicable print job in the printer 3 (S14), and the process is completed.

On the other hand, when it is judged that the printer stores the print job transmitted by the user in S13 (YES in S13), the control section 13 of the printer 3 judges if the available functions of the printer 3 include the function required to conduct the print job directed by the user, that is, if the printer 3 is suited for the output of the print job (S15). When it is judged that the printer 3 is suited for the print job (YES in S15), the printer 3 outputs the print job (S1), and the process is completed.

If NO in S15, that is, if it is judged that the printer 3 is not suited for the output of the print job, the display section of the printer 3 displays a message that the printer 3 is not suited for the print job (S17). Then, in a state where the user recognizes that the printer 3 is not suited for the print job, it is determined if the user still wishes to direct the output of the print job (S18). When the user still directs the output of the print job (If YES in S18), a sequence goes to S16 to perform the print job. On the other hand, when the user cancels the printout (If NO in S18), the process is terminated.

Here, when the printer 3 indicates on its display section that the printer 3 is not suited for the print job in S17, the printer 3 may be arranged so as to also indicate the information on other printer 3 which is suited to print out the print job, on its display section as described above. In addition, in the flow chart shown in FIG. 6(b), the printer 3 judges if the available functions of the printer 3 include the function required to conduct the print job, but when the image output system is provided with the print server 21 as shown in FIGS. 4 and 5, the print server 21 may make the above judgment.

The foregoing explanation shows examples where identification data including preparation time of the print data, the print job priority, name (ID) of the PC by which the print data is prepared, or the like, is used as management data for conducting the print jobs. The image output system of the present invention may be further arranged so as to limit the use of the printer 3 by the user by utilizing user management identification data as described below. The user management identification data includes department identification data on respective departments where the PCs 2 are installed in a company, user identification data provided for each user using the PCs 2, portable phone identification data set for each portable phone 1 storing the identification data, etc.

For example, there is a case that a plurality of the printers 3 connected as shown in FIGS. 4 and 5 are installed in different departments in a company. Recently an in-house branch system has been widely introduced in companies, and there are many cases that a self-financing system is adopted in each department. In such a company, there are cases that each department takes charge of the operation and maintenance management of the printer 3 installed in the department.

In such a case, if department identification data showing a specific department which the user belongs to is registered in the portable phone 1 in advance, a user of department A is restricted to use the printer 3 installed in department B. Besides, the printer 3 can be arranged so as to recognize the user identification data and limit the use not by department but by user. In this case, the image output system may be structured such that the user identification data is stored in the portable phone 1 and transmitted to the printer 3 when identification data is transmitted at the time of print direction. Further, the image output system may be structured such that specific data of the portable phone 1 is registered as the portable phone identification data to be used to restrict the operation of the printer 3.

While the identification data is prepared along with the print data by the PC 2, it is desirable that the department identification data, the user identification data, and the portable phone identification data used as the user management identification data are prepared apart from the print data and registered in the portable phone in advance. In other words, it is not necessary to prepare the department identification data, the user identification data, and the portable phone identification data along with the print data, and these data can be used for the operation control of the printer 3 without regard to the print data. Therefore, by registering the respective data in the portable phone beforehand, the operation of an electronic device can be controlled more efficiently.

Figure 7:
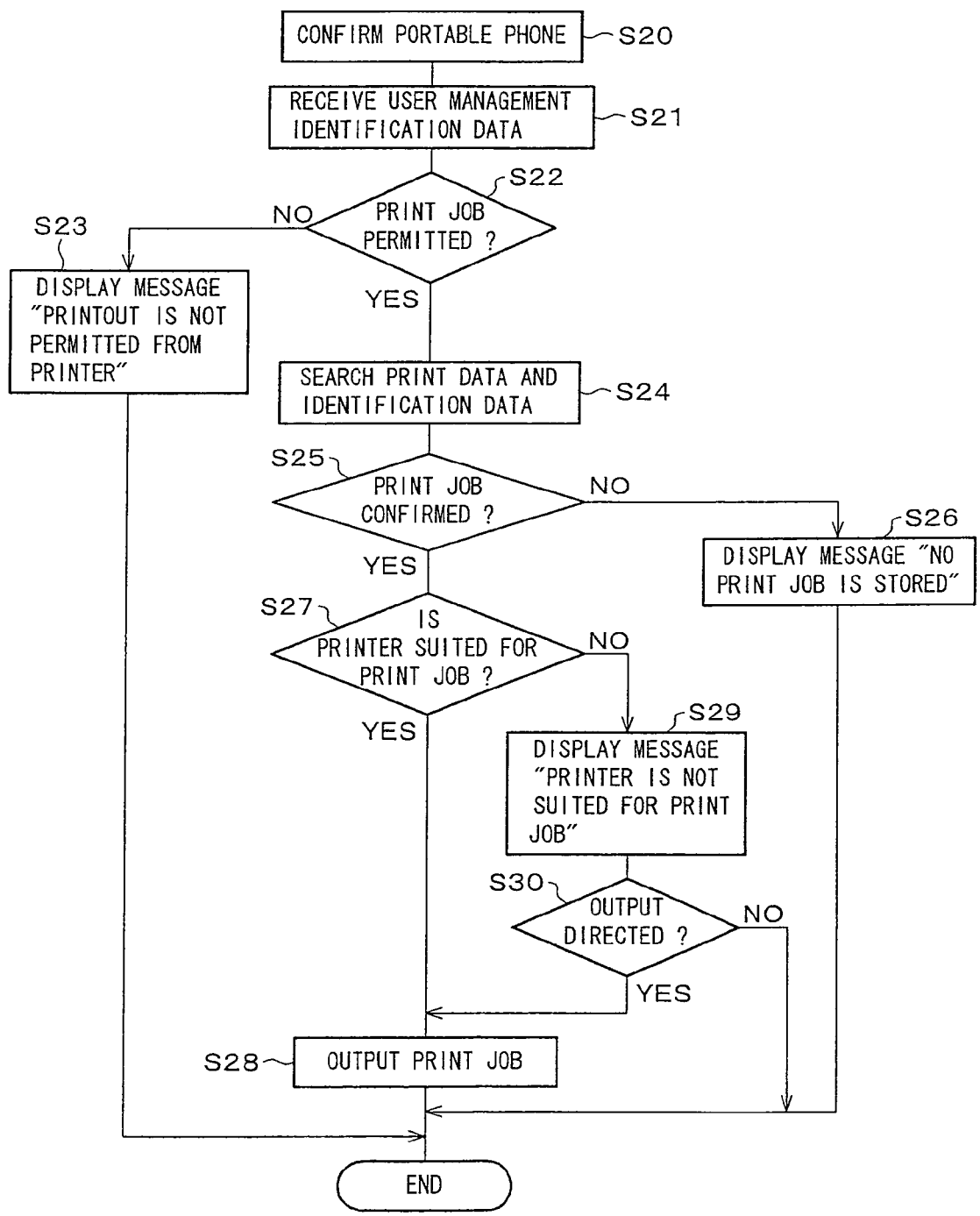
FIG. 7 is a flow chart showing the flow of processing in the control which limits the operation of the printer using user management identification data.

Referring to the flow chart shown in FIG. 7, the following will explain the control which limits the operation of the printer 3 using the above user management identification data. First, the processing in the PC 2 is the same as that described in the foregoing explanation on the flow chart shown in FIG. 6(*a*). That is, when a user directs a print job to the PC 2, print direction information is transmitted to the portable phone 1 and the content of the information is stored in the portable phone 1, and at the same time, print data and identification data for the print job are transmitted to the printer 3.

Next, the following will explain the flow of the processing in the printer 3. When the user having the portable phone 1 is approaching the printer 3 in S20, data transmission is conducted between the data transmitting/receiving section 10 of the portable phone 1 and the data transmitting/receiving section 17 of the printer 3, and the printer 3 recognizes the portable phone 1 and confirms that the specific user is approaching.

Then, the printer 3 receives the user management identification data which includes at least one of the department identification data, the user identification data, and the portable phone identification data, from the portable phone 1 (S21), and it is judged whether the print job the user desires to print out is permitted or restricted at the printer 3 (S22).

Here, a list of codes which are permitted for printout as shown in FIG. 8, for example, is stored in the printer 3, and the judgment whether the user is permitted to use the printer 3 or not is made according to whether the received user management identification data is included in the printout permission code list.

When it is judged that the user is permitted to use the printer 3 in S22, that is, the printout is permitted (YES in S22), a sequence goes to the next S24. On the other hand, when the printout is not permitted (NO in S22), the display section of the printer 3 display a message that the printer 3 is not permitted to print out the print job (S23), and the process is completed.

When the printout is permitted, the printer 3 searches the print data and the identification data stored in the printer 3 in S24, and confirms if the print job has been transmitted by the user approaching the printer 3 (S25). When it is judged that the printer 3 does not store the print job transmitted by the user in S25 (NO in S25), the display section of the printer 3 display a message that there is no applicable print job in the printer 3 (S26), and the process is completed.

On the other hand, when it is judged that the printer stores the print job transmitted by the user approaching the printer 3 (YES in S25), the control section 13 of the printer 3 judges if the available functions of the printer 3 include the function required to conduct the print job directed by the user, that is, if the printer 3 is suited for the output of the print job (S27). When it is judged that the printer 3 is suited for the print job (YES in S27), the printer 3 outputs the print job (S28), and the process is completed.

If NO in S27, that is, if it is judged that the printer 3 is not suited for the output of the print job, the display section of the printer 3 displays a message that the printer 3 is not suited for the print job (S29). Then, in a state where the user recognizes that the printer 3 is not suited for the print job, it is determined if the user still wishes to direct the output of the print job (S30). When the user still directs the output of the print job (If YES in S30), a sequence goes to S28 to perform the print job. On the other hand, when the user cancels the printout (If NO in S30), the process is terminated.

Here, when the printer 3 indicates on its display section that the printer 3 is not suited for the print job in S29, the printer 3 may be arranged so as to also indicate the information on other printer 3 which is suited to print out the print job, on its display section as described above. In addition, in the flow chart shown in FIG. 7, the printer 3 judges if the user is permitted to use the printer, and if the available functions of the printer 3 include the function required to conduct the print job, but when the image output system is provided with the print server 21 as shown in FIGS. 4 and 5, the print server 21 may make the above judgments.

With the above structure, the operation of the printer 3 can be limited in accordance with the user management identification data, which allows a specific user to use a specific printer 3 only, or, on the contrary, prohibits a specific user from using a specific printer 3. Consequently, when the PC 2 and the printer 3 are connected to the network 4, for example, it is possible to make a specific user to use only the printer 3 installed in a specific department.

Further, the image output system of the present invention can be applied to an accounting system such as copying service provided, for example, in convenience stores. For example, in a store such as a convenience store where a copying machine is installed, the image output system can be provided such that, while store staff members can use the copying machine for free, general customers cannot use the copying machine without paying for the copying service.

Figure 9:
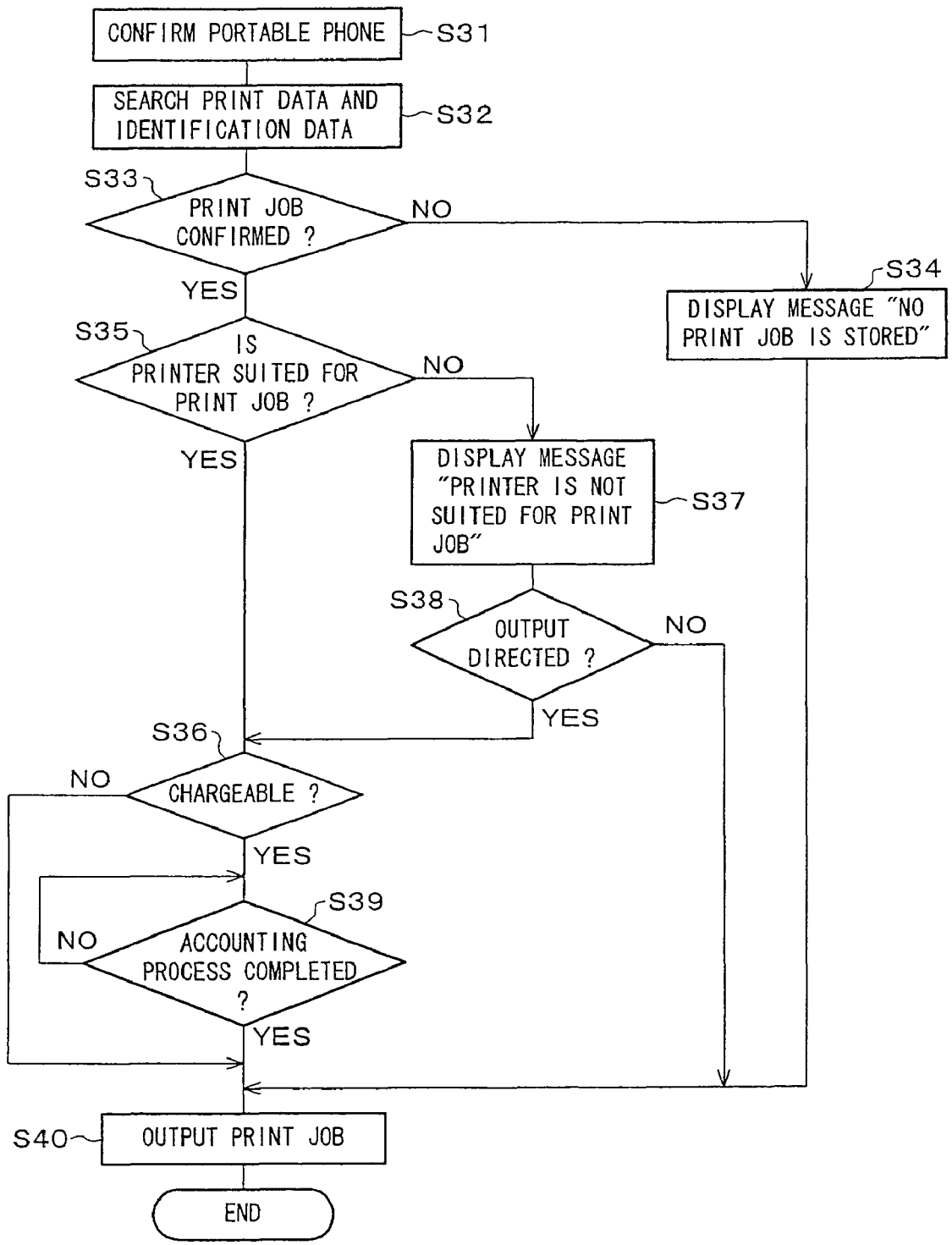
FIG. 9 is a flow chart showing the flow of processing in the printer when an accounting system is adopted.

Referring to the flow chart shown in FIG. 9, the following will explain the control when the image output system of the present invention is applied to such an accounting system. First, the operation in the PC 2 is the same as that described in the foregoing explanation on the flow chart shown in FIG. 6(*a*). That is, when a user directs a print job to the PC 2, print direction information is transmitted to the portable phone 1 and the content of the information is stored in the portable phone 1, and at the same time, print data and identification data for the print job are transmitted to the printer 3.

Next, the operation of the printer 3 will be explained. When the user who possesses the portable phone 1 approaches the printer 3 in S31, data transmission is conducted between the data transmitting/receiving section 10 of the portable phone 1 and the data transmitting/receiving section 17 of the printer 3, and the printer 3 recognizes the portable phone 1 possessed by the user by which the printer 3 confirms his approach.

Then, the printer 3 searches the print data and the identification data stored in the printer 3 in S32, and confirms if the print job is transmitted by the user approaching the printer 3 (S33). When it is judged that the printer 3 does not store the print job transmitted by the user in S33 (NO in S33), the display section of the printer 3 displays a message that there is no applicable print job in the printer 3 (S34), and the process is completed.

On the other hand, when it is judged that the printer stores the print job transmitted by the user approaching the printer (YES in S33), the control section 13 of the printer 3 judges if the available functions of the printer 3 include the function required to conduct the print job directed by the user, that is, if the printer 3 is suited for the output of the print job (S35). When it is judged that the printer 3 is suited for the print job (YES in S35), a sequence goes to the next S36.

If NO in S35, that is, if it is judged that the printer 3 is not suited for the output of the print job, the display section of the printer 3 display a message that the printer 3 is not suited for the print job (S37). Then, in a state where the user recognizes that the printer 3 is not suited for the print job, it is determined if the user still wishes to direct the output of the print job (S38). When the user still directs the output of the print job (If YES in S38), a sequence goes to S36 to perform the print job. On the other hand, when the user cancels the printout (If NO in S38), the process is terminated.

Meanwhile, when it is judged as YES in S35 or YES in S38, it is judged whether or not to charge the printout fee to the user approaching the printer 3 (S36). The judgment here is made by carrying out the same processing as the one in S21 and S22 in the flow chart shown in FIG. 7. That is, the users not charged for the printout, such as store staff members, for example, can be distinguished from general customers by having the portable phones 1 which transmit the printer 3 the user management identification data so as not to be charged for the printout.

When it is judged that the user should be charged for the printout in S36 (If YES in S36), an accounting process is conducted, and after the completion of the accounting process is confirmed (S39), the print job is conducted. When it is judged that the user is not charged for the printout (If NO in S36), the accounting process is not conducted, and the print job is conducted (S40).

Here, when the printer 3 displays a message that the printer 3 is not suited for the print job on its display section in S37, the printer 3 may be arranged so as to also indicate the information on other printer 3 which is suited to print out the print job, on its display section as described above. In addition, in the flow chart shown in FIG. 9, the printer 3 judges whether or not available functions of the printer 3 include the function required to conduct the print job, but when the image output system is provided with the print server 21 as shown in FIGS. 4 and 5, the print server 21 may make the above judgment.

In the foregoing examples shown in the respective flow charts, the image output system is structured such that the user can direct any print job at first, in principle. However, on the contrary, the image output system may be structured so as to set a certain limitation at first then lift the limitation only when recognizing specific users and print data. For example, in a control system which conducts an accounting system as shown in the flow chart in FIG. 9, the image output system may be structured so as to check the portable phone 1 first to recognize the user, then judge whether or not to lift the accounting to the user who has the portable phone 1. With such a system, especially in the foregoing copying service provided in convenience stores and the like, whether the user is a store staff member or a general customer is judged first, and when a store staff member is the user, the processing flow can be arranged so as to omit the following various judgments.

Figure 10:
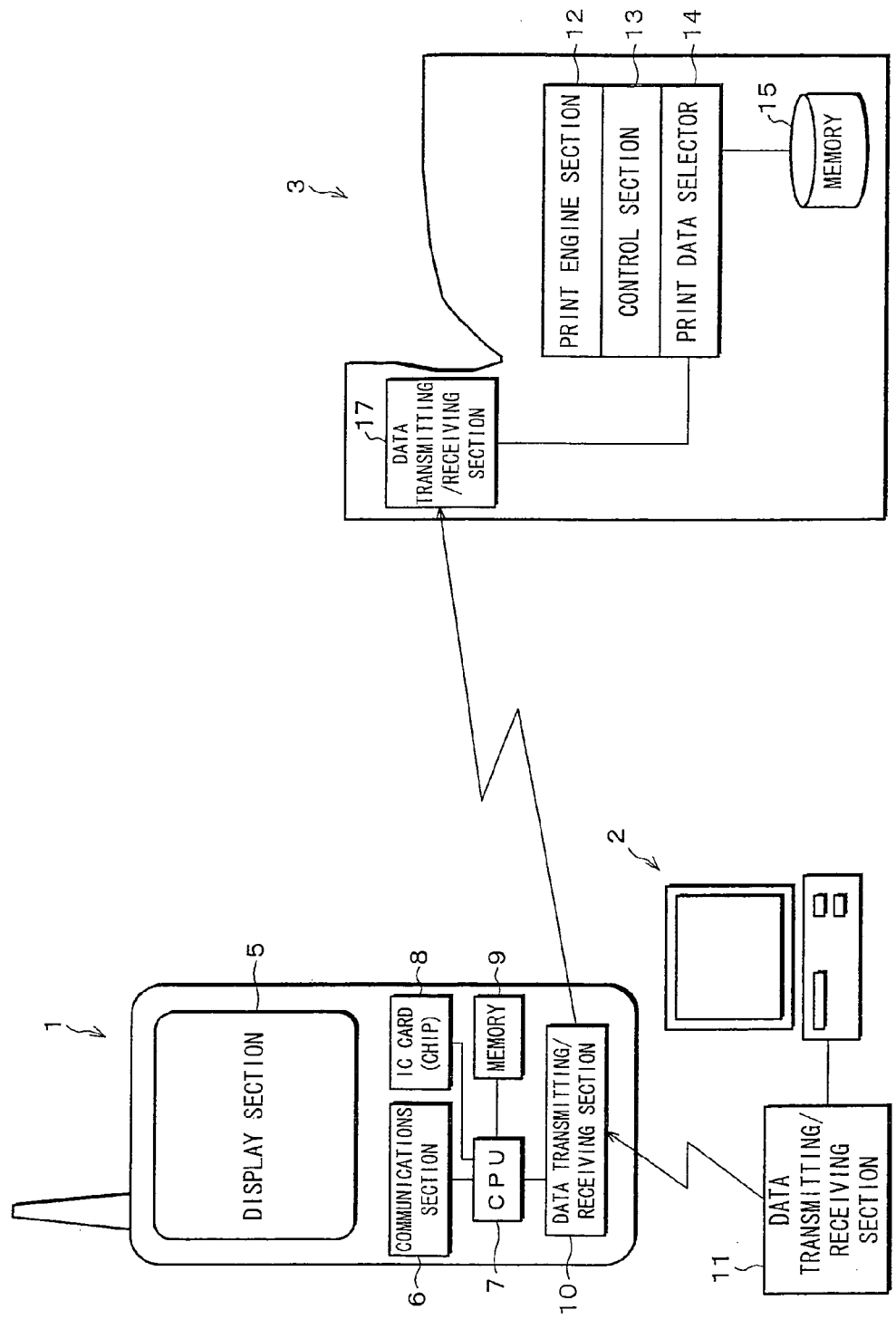
FIG. 10 is an explanatory view showing a schematic structure of an image output system where a PC and a printer is not connected via a network.

Next, as shown in FIG. 10, the following will explain the output processing in an image output system structured wherein a printer 3 and a PC 2 are not connected to a network 4. In such an image output system, print data prepared by the PC 2 is temporarily stored in a portable phone 1, and the portable phone 1 transmits the print data to the printer 3.

Figure 11:
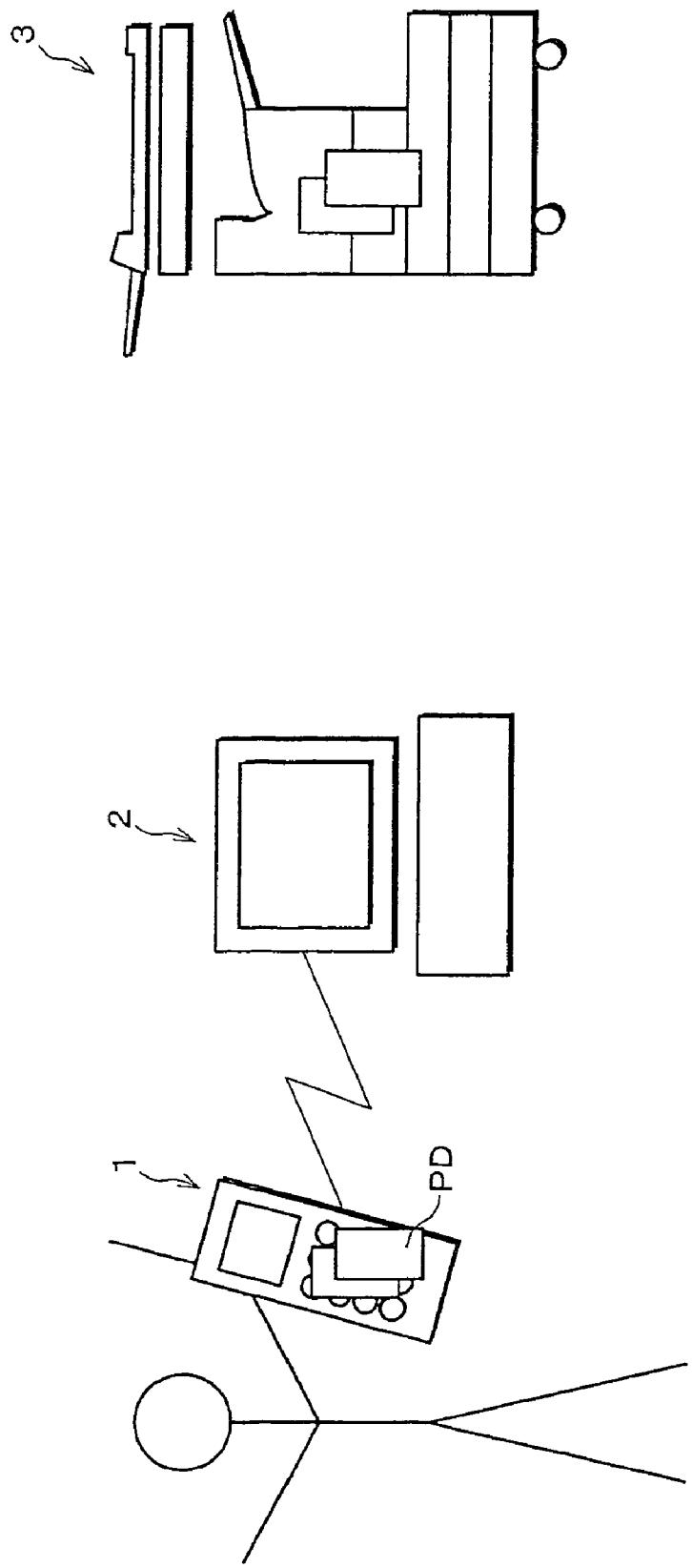
FIG. 11 is an explanatory view showing a condition where a print job is directed by the PC in the image output system shown in FIG. 10.

In a structure shown in FIG. 10, the portable phone 1 is means for transferring the print data. Thus, when a print job is directed from the PC 2, identification data is transmitted from the PC 2 to the portable phone 1, and as shown in FIG. 11, the print data PD is also transmitted to the portable phone 1.

Meanwhile, when the user having the portable phone 1 is approaching the printer 3, data transmission is conducted between the portable phone 1 and the printer 3, and as shown in FIG. 12, the print data PD stored in the portable phone 1 is transmitted from the portable phone 1 to the printer 3, along with the identification data. Here, the image output system may be structured such that user management identification data registered in the portable phone 1 in advance is transmitted to the printer 3 to control the limitations on conducting print jobs in accordance with the user management identification data.

In the structure shown in FIG. 1, print data is transmitted from the PC 2 via the network 4 to the printer 3, and identification data attached to the print data and identification data read from the portable phone 1 are checked. Consequently, for example, when a user transmits print data from the PC 2 to a specific printer 3 then approaches another printer 3 different from the specific printer 3 by mistake, the print job cannot be conducted at the different printer 3, and the user has to reconfirm which printer is the one the user transmitted the print data, which requires extra steps.

On the other hand, in the structure as shown in FIG. 10, print data is transmitted with identification data from the PC 2 to the portable phone 1, and both data are temporarily stored in the portable phone 1. That is, since the portable phone 1 also stores the print data, the portable phone 1 functions as data transferring means. Thus, it becomes possible to provide a system which does not require the network 4 to connect the PC 2 and the printer 3 but functions similar to the system having the network 4, that is, the system in which a print job prepared by any PC 2 can be printed out by any printer 3. In addition, even in an environment where the PC 2 and the printer 3 are connected to the network 4 to constitute an image output system, since the portable phone 1 can store print data temporarily, identification data and the print data can also be transmitted to the printer 3 which is not connected to the network 4 so as to perform a specified operation. Therefore, the versatility as an image output system can be further enhanced.

As has been discussed, the image output system in accordance with the present embodiment is structured such that the portable phone 1 can temporarily store identification data prepared by the PC 2. Conventionally, for example, operation control on the printer is conducted such that each user has a magnetic card storing identification data such as personal information, and the printer reads the magnetic card and conducts a print job directed by the user. That is, in this case, the printer can recognize who the user is, but it cannot judge which print job to be conducted.

On the other hand, in the image output system of the present invention, as described above, the portable phone 1 can temporarily store identification data prepared by the PC 2, and when the user having the portable phone 1 approaches the printer 3, the identification data is transmitted to the printer 3. That is, printing operation is controlled under a condition that the printer 3 recognizes not only the user, in the same way as in a conventional system, but also each print job directed by respective users. Therefore, it is possible to substantially reduce the user's time and efforts required to control the operation of the printer 3.

Further, in the above image output system, whichever of the method via a network or the method via a portable phone is adopted, identification data is prepared for each print data, and at least the identification data is stored in the portable phone 1. Hence, a print job is conducted only for the user who has the portable phone 1 storing a specified identification data, based on print data corresponding to the identification data, providing securer control on print jobs.

In the foregoing embodiment, a structure wherein the portable phone 1 is used to transmit/receive various data is taken as an example, but a portable information processing terminal or a card-type information recording medium may also be used, as far as it can store identification data prepared by the PC and the like, at least noncontact. Such equipment can always be carried with the user and has useful functions other than the functions used for the image output system of the present invention, and there is no need to prepare such equipment especially for the image output system of the present invention. In other words, portable terminals and the like widely used at present are used for the image output system of the present invention, which requires relatively less cost and efforts to introduce the foregoing system and allows smooth introduction of the system.

As has been discussed, an electronic device control system in accordance with the present invention is structured so as to include:

data preparation means for preparing operation data and preparing identification data corresponding to the operation data;

an electronic device which carries out processing based on the operation data prepared by the data preparation means; and portable data storage means for receiving the identification data prepared by the data preparation means, which includes identification data storage means for storing the identification data, wherein the portable data storage means transmits the identification data stored in the identification data storage means to the electronic device, and when the electronic device receives the identification data from the portable data storage means, the electronic device carries out the processing based on the operation data corresponding to the identification data.

In the foregoing structure, the electronic device control system of the present invention may be structured so as to further include:

transmitting means for transmitting the operation data prepared by the data preparation means to the electronic device.

According to the foregoing structure, the operation data prepared by the data preparation means is transmitted via the transmitting means to the electronic device, and the identification data prepared by the data preparation means is transmitted via the portable data storage means to the electronic device. Since the operation data is the data to direct the processing by the electronic device, it can be considered that, in many cases, the size of the operation data is larger than that of the identification data. That is, the operation data with a larger data size is transmitted via the transmitting means to the electronic device, and the identification data with a smaller data size, which triggers the actual processing by the electronic device, is transmitted via the portable data storage means to the electronic device. Thus, the structure allows the storage means in the portable data storage means to have a relatively small storage capacity, which permits a reduction in the manufacturing cost of the portable data storage means as well as the downsizing of the portable data storage means.

In the foregoing structure, the electronic device control system of the present invention may be structured such that the transmitting means is a network which connects at least one data preparation means and at least one electronic device.

According to the foregoing structure, since at least one data preparation means and at least one electronic device are connected via a network, it is possible to transmit operation data from any data preparation means to any electronic device to carry out the processing. Therefore, an electronic device control system with high versatility can be structured.

In addition, when a plurality of electronic devices and/or data preparation means are connected to the foregoing network, in a conventional structure, complicated procedures are required to direct a specific electronic device to perform an operation based on specific operation data. However, in the foregoing structure, since the electronic device reads the identification data from the portable data storage means and gets ready for operation, the operation of the electronic device can be securely controlled even in a complicated network.

In the foregoing structure, the electronic device control system of the present invention may be structured such that the portable data storage means receives/transmits identification data from/to the data preparation means and the electric device by wireless.

According to the foregoing structure, the portable data storage means transmits and receives the identification data by wireless, which is noncontact means. Therefore, for example, it is possible for the user who possesses the portable data storage means in his pocket to receive the identification data from the data preparation means and transmit the identification data to the electronic device, which substantially reduces the user's time and efforts required for operation procedures.

In the foregoing structure, the electronic device control system of the present invention may be structured such that the electronic device includes operation data storage means for storing the operation data transmitted from the data preparation means, and the electronic device checks the operation data stored in the operation data storage means against the identification data received from the portable data storage means when receiving the identification data, detects the operation data corresponding to the received identification data, and carries out the processing based on the operation data.

According to the foregoing structure, for example, in a structure in which a plurality of data preparation means are connected to one electronic device to output the operation data prepared by each data preparation means from the electronic device, the following effect can be obtained. That is, when operation data is respectively transmitted from a plurality of the data preparation means to one electronic device for output, each operation data is stored in the operation data storage means of the electronic device. When the electronic device receives the identification data from the portable data storage means, the electronic device checks the operation data stored in the operation data storage means against the identification data, detects suitable operation data for the identification data, and carries out the processing based on the operation data. Therefore, even when receiving the operation data from a plurality of the data preparation means, the electronic device can store each operation data in the operation data storage means within the device, and when actually carrying out the processing upon receiving the identification data, the electronic device can carry out the processing based on the operation data corresponding to the applicable identification data. Thus, the operation of the electronic device via a network can be controlled more efficiently.

In the foregoing structure, the electronic device control system of the present invention may be structured so as to further include:

operation data management means, connected to the foregoing network, for storing the operation data prepared by the data preparation means and for managing a data output process to output the operation data to the electronic device.

According to the foregoing structure, it is possible, for example, to form a network system in which a plurality of the data preparation means are connected to a plurality of the electronic devices, and the operation data prepared by each data preparation means is outputted by a specified electronic device. Further, since this network contains the operation data management means, there is no need to provide the operation data storage means in each of the electronic devices, and the output of a plurality of the operation data can be managed by the single operation data management means, which lessens the burden on each electronic device.

An electronic device control system in accordance with the present invention is structured so as to include:

data preparation means for preparing operation data;

an electronic device which carries out processing based on the operation data prepared by the data preparation means; and portable data storage means for receiving the operation data prepared by the data preparation means, which includes operation data storage means for storing the operation data, wherein the portable data storage means transmits the operation data stored in the operation data storage means to the electronic device, and when the electronic device receives the operation data from the portable data storage means, the electronic device carries out the processing based on the operation data.

In the foregoing structure, the electronic device control system of the present invention may be structured such that the electronic device includes display means, and control means of the electronic device confirms the content of the operation data, judges whether or not the electronic device has function means for performing a selected function required to perform an operation based on the operation data, then indicates the judgment result on the display means.

For example, when a user directs the output of the operation data prepared by specific data preparation means to any electronic device, there is a possibility that the electronic device does not have various functions to perform an operation based on the operation data. Hence, in the foregoing structure, the control means of the electronic device judges whether or not the electronic device has a function to perform the operation based on the inputted operation data and indicates the result on the display means. This structure provides the user with accurate information on the operation condition of the electronic device, ensuring more reliable operation control of the electronic device.

In the foregoing structure, the electronic device control system of the present invention may be structured such that the portable data storage means also stores user management identification data and transmits the user management identification data to the electronic device, and the electronic device controls to limit the performance of an operation by the electronic device based on the user management identification data received from the portable data storage means.

According to the foregoing structure, the operation of the electronic device is limited based on user management identification data. Therefore, when using a specific portable data storage means, the structure can limit an operation to be performed only by a specific electronic device, or, on the contrary, restrict the use of a specific electronic device to perform an operation. Consequently, when the data preparation means and the electronic device are connected to the network, for example, it is possible to allow an operation to be performed only by an electronic device installed in a specific department, based on the user management identification data stored in the portable data storage means. The structure can also be applied to the case where the electronic device is used for service in which the user has to pay for the performance of an operation.

In the foregoing structure, the electronic device control system of the present invention may be structured such that the user management identification data includes at least either one of department identification data identifying the department in which the data preparation means for preparing operation data is installed, user identification data specified for each user, and storage means identification data specified for each portable data storage means.

In the foregoing structure, when the department identification data, which identifies the department in which the data preparation means for preparing operation data is installed, is used as the user management identification data, it becomes possible to control the operation of the electronic device, in such a manner that the operation data prepared by the data preparation means in a specific department can be used to operate only the electronic device installed in the specific department. Therefore, service condition of the electronic devices in a company can be grasped by each department, and each department can surely handle maintenance management for the installed electronic device such as handling of consumables.

When the user identification data specified for each user is used as the user management identification data, it becomes possible to select a specific user. Hence, when a store provides service accounting for the operation of the electronic device, for example, a user such as a store staff member who has the registered user identification data can use the electronic device for free, and an unregistered user such as a general customer is charged for the operation of the electronic device based on the user identification data. Therefore, the limitations on the use of the electronic device can easily be switched between the two cases.

Further, when the storage means identification data specified for each portable data storage means is used as the user management identification data, the use of the electronic device can be limited only to the user who has specific portable data storage means. Therefore, this type of data can be used for service, for example, in which a specific portable data storage means is lent to a user to use a specific electronic device.

In the foregoing structure, the electronic device control system of the present invention may be structured such that the user management identification data is registered in the portable data storage means in advance.

Since it is not necessary to prepare the user management identification data along with the operation data, and the user management identification data can be used for the operation control of the electronic device without regard to the operation data, the operation of the electronic device can be controlled more efficiently by registering the respective user management identification data in the portable data storage means in advance.

In the foregoing structure, the electronic device control system of the present invention may be structured such that the electronic device is an image output device and the operation data is print data.

According to the foregoing structure, the portable data storage means can control the operation of the image output device. Thus, when a user wishes to print out the print data prepared by the data preparation means, all the user has to do to obtain the desired print is to approach the image output device with the portable data storage means: the user does not have to take further steps such as selecting the print data to be printed out. Besides, the printout is conducted only when the user approaches the image output system, preventing the desired print from being mixed into other prints.

In addition, in the case that the user management identification data is used to limit the use of an image output device as described above, for example, when an image output device is connected to a network in a company, service condition of the image output device can be managed by each department. Or, when the image output device is used for copying service, the user management identification data can control both the accounting and the permission for using the copying service for a customer having specific portable data storage means.

In the foregoing structure, the electronic device control system of the present invention may be structured such that the data preparation means is a personal computer.

According to the foregoing structure, by using a personal computer which can prepare a variety of data as the data preparation means, operation data prepared for the operation of the electronic device is provided in a wide range, enhancing the versatility in the operation control of the electronic device.

In the foregoing structure, the electronic device control system of the present invention may be structured such that the portable data storage means includes at least one element selected from the group consisting of a portable phone, a portable information processing terminal, and a card-type information recording medium.

If the portable data storage means is a portable phone, a portable information processing terminal, or a card-type information recording medium, as in the foregoing structure, a user can always carry the portable data storage means. Besides, since each equipment has original applications different from those of the portable data storage means of the present invention, there is no need to prepare portable data storage means especially for the image output system of the present invention, enhancing versatility and convenience of the electronic device control system.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A printer control system comprising:
   data preparation means for preparing operation data including print data and identification data;
   a printer for carrying out processing based on the operation data prepared by said data preparation means; and
   portable data storage means for wirelessly receiving the operation data prepared by said data preparation means, said portable data storage means including operation data storage means for storing the operation data,
   wherein said portable data storage means wirelessly and automatically transmits the operation data stored in said operation data storage means to said printer when a user having said portable data storage means moves to a vicinity of said printer after the operation data is received from said data preparation means in a vicinity of said data preparation means and stored in said operation data storage means, and
   when said printer receives the operation data from said portable data storage means, said printer confirms the content of the operation data thus received and judges whether or not said printer has function means for performing a selected function required to perform an operation based on the print data, before said printer carries out the print processing based on the print data, said selected function being at least one of a color print function, a high-speed printing function, a sorting function, a FAX function, a stapling function and a binding function, and
   in a case where said printer does not have said function means, a display section provided in said printer displays a message to the effect that said printer is not suitable for carrying out output processing of the print data, and
   further wherein said portable data storage means also stores user management identification data, and transmits the user management identification data to said printer; and
   said printer control system limits the performance of an operation by said printer based on the user management identification data received from said portable data storage means.

2. The printer control system of claim 1, wherein said printer includes display means for displaying a judged result of whether or not said printer has the function means.

3. The printer control system of claim 1, wherein:
   the user management identification data includes data of at least one kind selected from the group consisting of department identification data identifying the department in which said data preparation means for preparing operation data is installed, user identification data set for each user, and storage means identification data set for each portable data storage means.

4. The printer control system of claim 1, wherein:
   the user management identification data is registered in said portable data storage means in advance.

5. The printer control system of claim 1, wherein:
   said printer is an image output device, and the operation data is print data.

6. The printer control system of claim 1, wherein: said data preparation means is a personal computer.

7. The printer control system of claim 1, wherein:
   said portable data storage means includes at least one element selected from the group consisting of a portable phone, a portable information processing terminal, and a card-type information recording medium.

8. A data preparation device comprising:
   a data preparation section for preparing operation data to control the operation of a printer, the operation data including print data and identification data; and
   an operation data transmitting section for transmitting the operation data prepared by said data preparation section to a portable data storage device which includes operation data storage means for storing the operation data and has functions to wirelessly receive the operation data prepared by said data preparation section and to wirelessly and automatically transmit the operation data stored in the operation data storage means to said printer when a user having said portable data storage device moves to a vicinity of said printer after the operation data is received from said data preparation section in a vicinity of said data preparation section and stored in said operation data storage means,
   wherein, when said printer receives the operation data from said portable data storage means, said printer confirms the content of the operation data thus received and judges whether or not said printer has function means for performing a selected function required to perform an operation based on the print data, before said printer carries out the processing based on the print data, said selected function being at least one of a color print function, a high-speed printing function, a sorting function, a FAX function, a stapling function and a binding function, and
   in a case where said printer does not have said function means, a display section provided in said printer displays a message to the effect that said printer is not suitable for carrying out output processing of the print data, and further wherein said portable data storage means also stores user management identification data, and transmits the user management identification data to said printer; and said printer control system limits the performance of an operation by said printer based on the user management identification data received from said portable data storage means.

9. A printer comprising:

a receiving section for receiving operation data from a portable data storage device which includes operation data storage means for storing the operation data and has functions to wirelessly receive the operation data from a data preparation device which prepares the operation data including print data and identification data and to wirelessly and automatically transmit the operation data stored in said operation data storage means to said printer when a user having said portable data storage device moves to a vicinity of said printer after the operation data is received from said data preparation section in a vicinity of said data preparation section and stored in said operation data storage means; and a judging section for confirming the contents of the operation data received by the receiving section, and for judging whether or not said printer itself has function means for performing a selected function required to perform an operation based on the print data, before said printer carries out a processing based on the print data received by the receiving section, said selected function being at least one of a color print function, a high-speed printing function, a sorting function, a FAX function and a binding function, and wherein, in a case where said printer does not have said function means, a display section provided in said printer itself displays a message to the effect that said printer is not suitable for carrying out output processing of the print data, and further wherein said portable data storage means also stores user management identification data, and transmits the user management identification data to said printer; and said printer control system limits the performance of an operation by said printer based on the user management identification data received from said portable data storage means.

* * * * *